United States Patent [19]

Witkowski et al.

[11] Patent Number: 5,327,868

[45] Date of Patent: Jul. 12, 1994

[54] VEHICLE IGNITION SYSTEM HAVING ADAPTIVE KNOCK RETARD WITH STARTING TEMPERATURE CORRECTION

[75] Inventors: Michael R. Witkowski, Waterford; Michael L. Velliky, Fenton; Keith C. Mitchell, Ypsilanti; Kenneth R. Kridner, Holly; William J. Bolander, Clarkston, all of Mich.

[73] Assignees: Saturn Corporation, Troy, Mich.; Delco Electronics Corporation, Kokomo, Ind.

[21] Appl. No.: 92,534

[22] Filed: Jul. 19, 1993

[51] Int. Cl.⁵ .............................................. F02P 5/15
[52] U.S. Cl. ..................................... 123/421; 123/425
[58] Field of Search ..................... 123/421, 424, 425

[56] References Cited

U.S. PATENT DOCUMENTS

| | | | |
|---|---|---|---|
| 4,458,646 | 7/1984 | Suzuki et al. | 123/424 X |
| 4,586,474 | 5/1986 | Akasu | 123/421 X |
| 4,630,584 | 12/1986 | Higashiyama et al. | 123/421 X |
| 4,969,440 | 11/1990 | Murakami et al. | 123/425 |
| 5,000,149 | 3/1991 | Miyama | 123/425 |
| 5,090,382 | 2/1992 | Bolander et al. | 123/425 |
| 5,222,470 | 6/1993 | Oonuma et al. | 123/421 X |
| 5,233,962 | 8/1993 | Fodale et al. | 123/425 |
| 5,243,942 | 9/1993 | Entenmann et al. | 123/425 |

Primary Examiner—Willis R. Wolfe
Attorney, Agent, or Firm—Robert M. Sigler

[57] ABSTRACT

A vehicle engine utilizes adaptive knock retard in which non-volatile memory cells store slowly changed values based on sensed knock to retard ignition timing. Upon engine start, the values in one or more of the memory cells may be reduced in a proportional manner to provide a more advanced engine ignition timing more appropriate to engine warmup. The proportional reduction is based on the sensed engine coolant temperature at the initiation of engine operation, either by itself or through the difference between it and the stored engine coolant temperature from just before the cessation of the last period of engine operation.

3 Claims, 3 Drawing Sheets

VEHICLE IGNITION SYSTEM HAVING ADAPTIVE KNOCK RETARD WITH STARTING TEMPERATURE CORRECTION

BACKGROUND OF THE INVENTION

This invention relates to a vehicle engine ignition timing system of the type utilizing adaptive knock retard in which memory cells store slowly changed values based on sensed knock which are used to retard ignition timing. Such cells are preferably non-volatile so as to retain the values between periods of engine operation; and the values are thus available upon each re-initiation of engine operation.

Engine knock, however, is temperature dependent. There is a much greater tendency for an engine to knock at high engine temperatures than at low engine temperatures. When an engine becomes completely warmed up after some period of operation, its temperature is controlled to a substantially predetermined temperature, under normal conditions, by the coolant flow regulating action of a thermostatic valve. This temperature is typically much higher than the ambient temperature outside the vehicle engine compartment. During engine operation, the memory cells of the ignition timing system may be slowly adjusted toward greater retard by the increased knock at the higher temperature.

However, after the engine has ceased operation for some time and cooled to the ambient temperature present outside the vehicle engine compartment, it has much less tendency to knock; and significantly less timing retard is desired. This is particularly the case where the vehicle has remained non-operated overnight and is started in the cooler ambient temperatures of the morning. In such cases, easier starts and smoother cool running may be obtained with less retard. However, the memory cells will take some time to gradually advance the timing; and, in fact, the engine control may be programmed to make no changes to the cells until the engine is fully warmed up and operating in a stable engine operating mode. This can leave the ignition timing less than optimally advanced during cold start and warmup.

SUMMARY OF THE INVENTION

This invention improves cold start and warmup operation of a vehicle engine having such an ignition timing system by sensing the coolant temperature at engine start and immediately reducing the values in one or more of the memory cells to provide a more advanced engine ignition timing. This reduction of the memory cell values is preferably performed in a proportional manner, based on the sensed engine coolant temperature at the initiation of engine operation, either by itself or through the difference between it and the stored engine coolant temperature from just before the cessation of the last period of engine operation. The result of the operation of this invention is to provide an ignition timing during engine warmup which is more advanced as appropriate to the lower engine coolant temperature.

DESCRIPTION OF A PREFERRED EMBODIMENT

Figure 1:
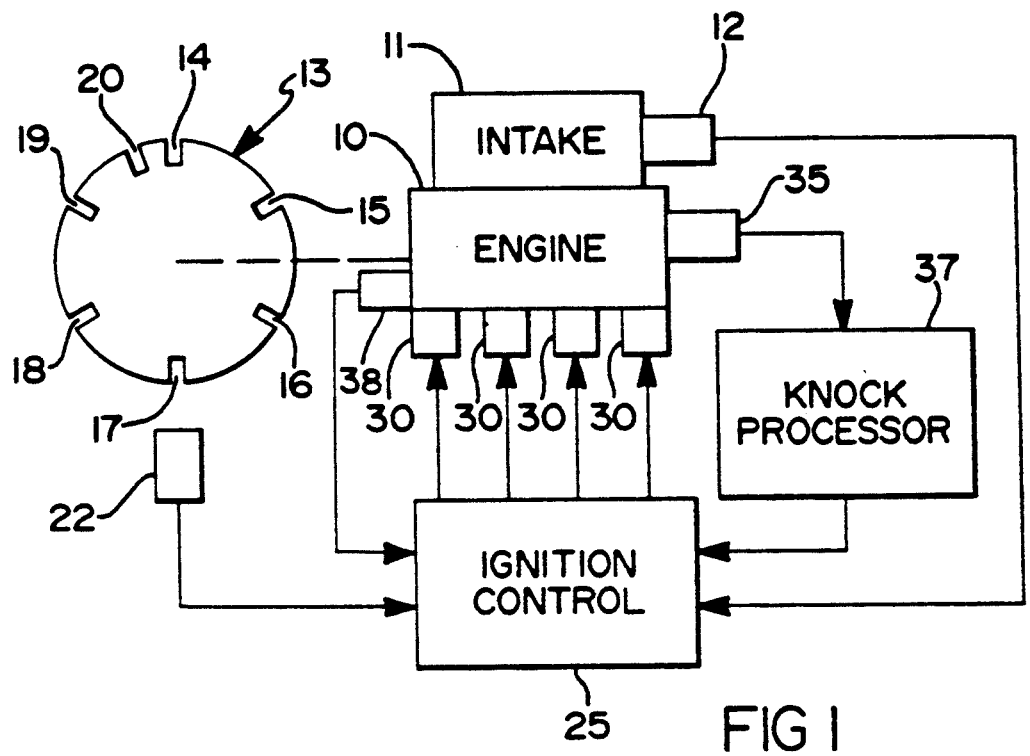
FIG. 1 is a block diagram of a vehicle engine including an ignition timing system according to the invention.

Referring to FIG. 1, an internal combustion engine 10 includes fuel intake apparatus 11 having a load sensor 12. Fuel intake apparatus 11 may be a carburetor or fuel injection system and includes an intake manifold to route the fuel charges to the various combustion chambers of the engine. Load sensor 12 may be responsive to engine vacuum or manifold absolute pressure to provide an analog electric voltage comprising the engine load signal. Engine 10 further comprises a disk 13 formed as part of the crankshaft of engine 10 having six slots 14-19 spaced 60 degrees apart rotationally and a seventh slot 20 spaced 10-20 degrees rotationally from slot 14. A magnetic optic pickup 22 is responsive to the passage of each of slots 14-20 as disk 13 rotates with the crankshaft of engine 10 to generate crankshaft position indicating pulses from slots 14-19 and a synchronizing pulse from slot 20. Slots 14 and 17, 180 degrees apart, are so located as to indicate top dead center (TDC) of the combustion chambers of a four cylinder engine with slot 20, adjacent slot 14, indicating cylinders 1 and 3.

The pulses from pickup 22 and engine load signal from sensor 12 are provided to an ignition control 25 which fires spark plugs 30 in proper order and at optimum times in the operation of engine 10. Typically cylinders 1 and 3 are fired together alternating with cylinders 2 and 4 fired together, but only one cylinder fired at any given time has an ignitable fuel charge. Ignition control 25 may comprise a digital computer including a central processing unit (CPU), input/output (I/O) apparatus, memory including RAM and ROM which includes a stored program and standard bus, clock, addressing and synchronizing apparatus. The computer of ignition control 25 is effective to generate ignition timing signals in response to the inputs from sensor 12, pickup 22 and other sensors as appropriate in accordance with a portion of a stored program embodying the ignition control algorithm for the engine. Ignition control 25 further comprises an ignition power circuit, including ignition coils, responsive to the ignition timing signals from the computer to generate and output high voltage ignition pulses to spark plugs 30, one of which is provided for each of the four cylinders or combustion chambers of engine 10. A basic description of the system may be found in the 1987 Grand Am Service Manual published by the Pontiac Division of General Motors Corporation.

Figure 2:
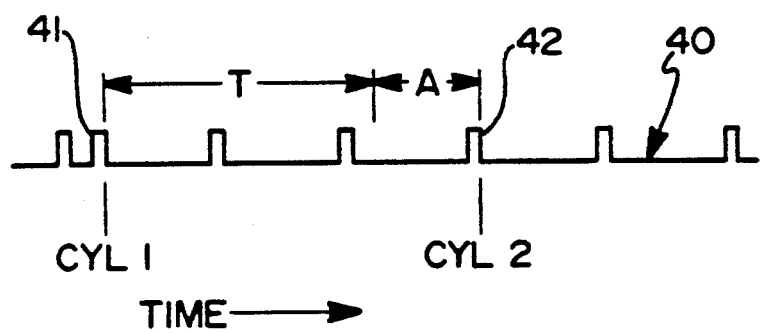
FIG. 2 is a waveform useful in understanding the operation of the engine of FIG. 1.

In operation, ignition control 25 receives pulses from pickup 22 in a waveform 40 as shown in FIG. 2 and measures the intervals between successive pulses from pickup 22. From these intervals, ignition control 25 identifies the pulses occurring at TDC of the cylinders, such as pulse 41 for cylinder 1, pulse 42 for cylinder 2 and other pulses, not shown, for cylinders 3 and 4 in four cylinder engine 10. In order to fire the spark plug of cylinder 2 with an advance relative to TDC of cylinder 2, the ignition timing signal of cylinder 2 is timed from the earlier occurring TDC of cylinder 1. With reference to FIG. 2, a spark advance "A" relative to TDC of cylinder 2 is produced by delaying the ignition timing signal for cylinder 2 by a time corresponding to crank angle "T" after TDC of cylinder 1. Since the engine speed is changeable with respect to the clock timing of the ignition control, the latter uses engine speed determined from the time periods between pulses from slots 14–19 to determine and adjust the time period corresponding to crank angle "T" in a manner known in the art.

Engine 10 is further provided with a knock sensor 35, which may be any vibration or other sensor known in the art for producing a signal of a knock related engine parameter. Sensor 35 provides an output signal to a knock processor 37 which substantially reduces the noise in the signal of sensor 35 and generates a knock signal when knock occurs. The knock signal output of knock processor 37 may be in the form of a count in a counter which is increased in response to each identified knock event or condition.

Ignition control 25 derives ignition timing in a manner described with reference to the flow chart of FIG. 3: DERIVE IGNITION TIMING. This flow chart describes a subroutine or other portion of the engine control program which repeats every 12.5 milliseconds. In step 80, a basic timing is derived from engine speed, load and other sensed operating parameters as is well known to those skilled in the art. For example, the basic timing may be a value derived from a look-up table in ROM referenced in a two-dimensional array of engine speed and load parameters, the engine speed parameter derived from the time durations between pulses from pickup 22 and slots 14–19 in disc 13 and the engine load parameter derived from sensor 12. The actual value of the basic timing may be further modified by other engine operating parameters such as engine coolant temperature, fuel composition, etc. This basic timing may be expressed for convenience in degrees after TDC of the previous firing cylinder. In step 81, this value is corrected for current knock based on the output of knock processor 37. This correction may be performed, for the purposes of the invention described herein, in any number of well known ways, one preferred example of which is shown in U.S. Pat. No. 5,090,382, VEHICLE ENGINE IGNITION TIMING SYSTEM WITH ADAPTIVE KNOCK RETARD, issued Feb. 25, 1992 and assigned to the assignee of this application, the description of which is incorporated herein by reference.

Figure 3:
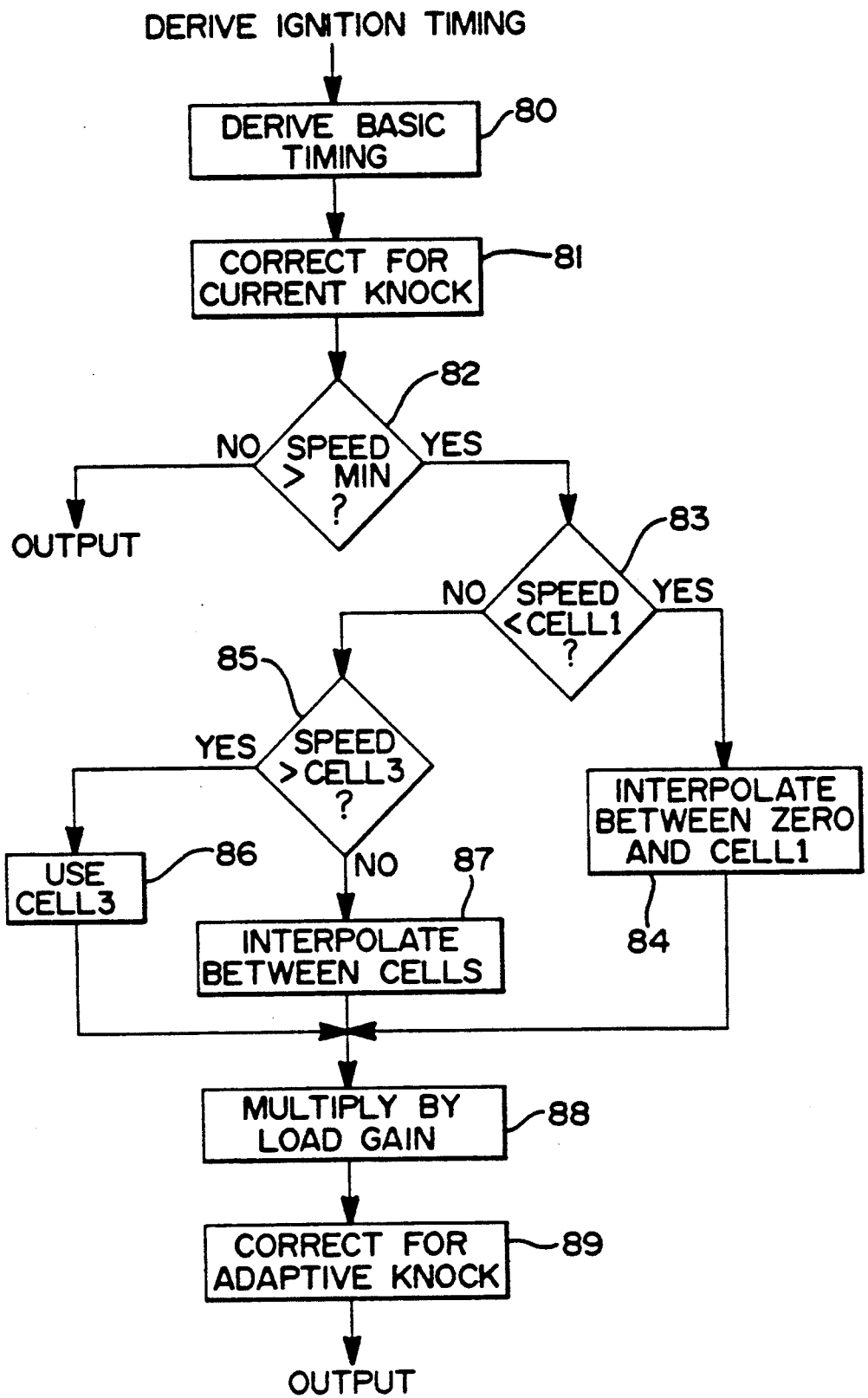
FIG. 3 is a flowchart describing part of the operation of the ignition system of this invention.

Ignition control 25 further adjusts the current knock corrected ignition timing with an adaptive knock retard derived as shown in the remainder of the flow chart of FIG. 3. At decision point 82, the engine speed is compared with MIN, a minimum engine speed for adaptive knock correction. MIN is close to idle speed: for example 850 RPM, since adaptive knock retard is not used in cranking or idle. If engine speed is not greater than MIN, there is no adaptive knock correction; and the current knock corrected ignition timing is output as the ignition timing. However, if engine speed exceeds MIN (850 RPM), an adaptive knock retard will be derived from the contents of one or more of three adaptive retard cells in the RAM of ignition control 25. Each of these cells comprises a pair of 8-bit bytes and is thus capable of storing a 16 bit number which may be updated periodically in a separate subroutine at a slower rate, such as every 200 milliseconds, by ignition control 25, so that the system may learn knock affecting variations in fuel, environmental operating parameters such as temperature and humidity, and changes due to system aging. In this embodiment, three such cells are used, each occupying two eight-bit bytes; and each cell is associated with a predetermined engine speed. CELL1 corresponds to 1,200 RPM; CELL2 corresponds to 1,800 RPM; and CELL3 corresponds to 2,400 RPM. Although the engine may be capable of 6,000–7,000 RPM top engine speed, most knock occurs in the lower engine speed range; and, for optimal resolution and control, the adaptive knock cells are concentrated in this range.

If engine speed is greater than 850 RPM, at decision point 83 the engine speed is compared with the speed corresponding to CELL1: 1,200 RPM. If it is less than 1,200 RPM, it must be between MIN and CELL1; and a preliminary adaptive retard value is derived in step 84 by linear interpolation between zero (value at 850 RPM) and the number in CELL1. If the engine speed is not less than that of CELL1, it is compared at decision point 85 with the speed of CELL3. If it is greater than CELL3, the number in CELL3 is looked up in step 86 for use as the preliminary adaptive retard value. If the engine speed is not greater than that of CELL3, it must be between that of CELL1 and CELL3; and the preliminary adaptive retard value is determined in step 87 by linear interpolation between cells. In greater detail, an engine speed of exactly 1,200, 1,800 or 2,400 RPM would provide a value of the number CELL1, CELL2 or CELL3, respectively; an engine speed between 1,200 and 1,800 RPM would be interpolated between the numbers in CELL1 and CELL2; and an engine speed between 1,800 and 2,400 RPM would be interpolated between the numbers in CELL2 and CELL3.

When the engine speed dependent preliminary adaptive retard value is derived as explained above, it is multiplied in step 88 by a load gain derived from the sensed engine load. Generally, it increases with engine load. The load gain may be stored as a set of numbers in a look-up table addressed with engine load and derived with interpolation. The product of the preliminary adaptive knock retard value and the load gain is the adaptive knock retard. The adaptive retard is added to the current knock corrected basic timing in step 89 to produce the ignition timing for output. This value, scaled for engine speed, may be used with a counter referenced to the appropriate TDC pulse to generate an ignition timing signal at the desired moment so as to fire the appropriate spark plug.

The adaptive cells CELL1, CELL2 and CELL3 are updated in a separate subroutine every 200 milliseconds. One such subroutine is described in detail in the aforementioned U.S. Pat. No. 5,090,382 and is thus not so described herein. It allows updating of cells at a much slower rate than the determination of ignition timing in the subroutine DERIVE IGNITION TIMING described above and further places a limit on the amount of change in a cell at one time. In addition, it may be programmed not to allow cell change at all when the engine is cold or operating in an unstable manner.

Figure 4:
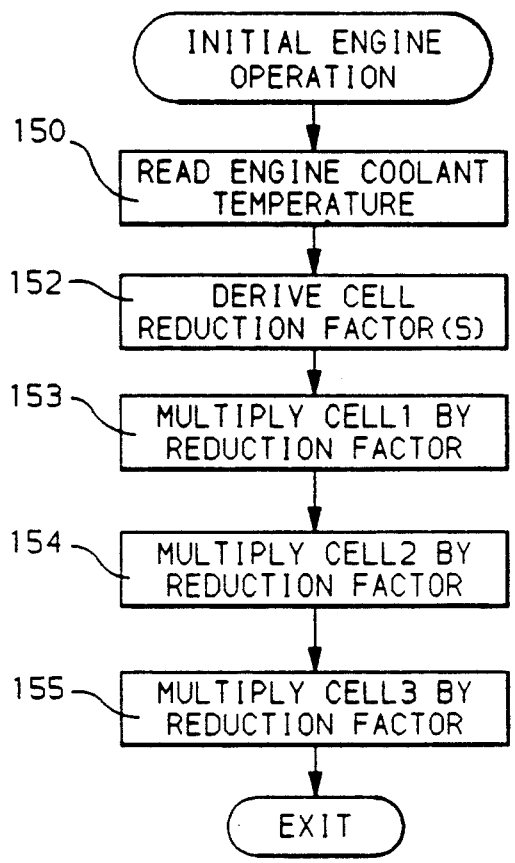
FIGS. 4-6 are flowcharts of alternative embodiments of another part of the ignition system of this invention.

In order to provide the benefits of this invention, an algorithm is added to a subroutine INITIAL ENGINE OPERATION, which is run at each initiation of engine operation. The relevant portion of this subroutine, which is shown in FIG. 4, determines the engine coolant temperature and reduces the values in CELL1, CELL2 and CELL3 accordingly. Referring to FIG. 4, the subroutine first reads the engine coolant temperature from a coolant temperature sensor 38 at step 150. At step 152, this temperature is used to address a look-up table of cell reduction factors as a function of coolant temperature. For example, three values may be stored:

a factor of 0 for 8 degrees C., a factor of 75% for 56 degrees C. and a factor of 90% for 104 degrees C. Linear interpolation may be used between the three addressing temperatures to derive the actual cell reduction factor.

At step 153, the value of CELL1 is proportionally reduced by being multiplied by the factor determined in step 152. Actually, the factor is stored as the binary number which is the specified percentage of decimal 256; and the product of the factor and the memory cell value is right shifted in its register(s) eight times to divide by decimal 256. The values of CELL2 and CELL3 are likewise reduced in steps 154 and 155.

The result of this subroutine is a one time reduction in the memory cells to correct for the most common engine operating pattern: an engine operation of sufficient duration to raise engine coolant temperature to its warmed-up level followed by a cessation of engine operation and a subsequent restart. The cell values are reduced proportionately by a cell reduction factor which increases the constant of proportional reduction with the drop in engine coolant temperature that occurs during the period that the engine is not running. This correction is adequate for normal engine operation.

Figure 5:
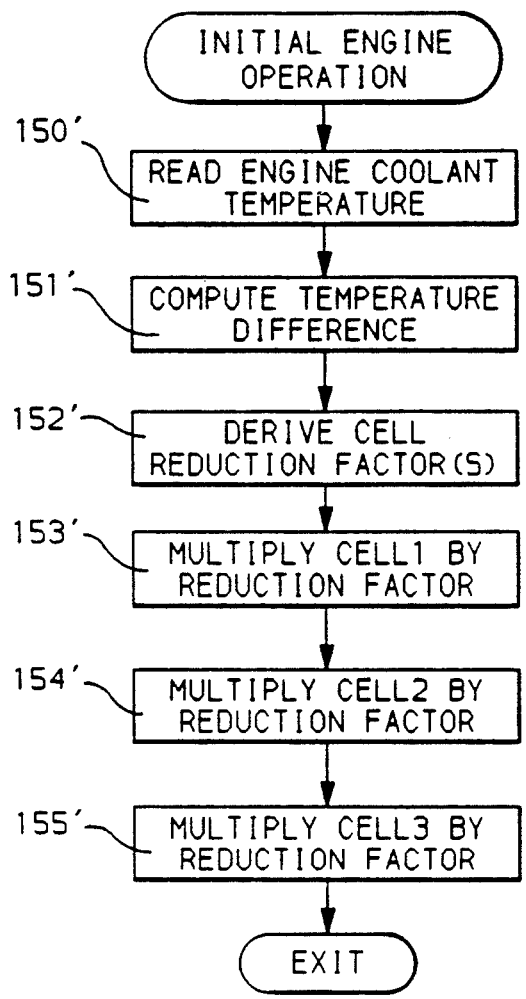

An alternative subroutine INITIAL ENGINE OPERATION is shown in FIG. 5. In this subroutine the cell reduction factors are determined by the difference between the engine coolant temperature at engine start and the engine coolant temperature at the end of the last period of engine operation. The cell reduction is thus more accurately matched to the actual reduction in engine coolant temperature in cases wherein the previous engine operation did not fully warm up the engine. However, this subroutine requires slightly more computer code and, more importantly, additional non-volatile writable memory to store the previous engine coolant temperature.

The flowchart of this alternative INITIAL ENGINE OPERATION subroutine comprises mostly similar steps, marked with primed reference numbers, as seen in FIG. 5. There are two differences, however. The first is the insertion, after step 150', of a step 151' in which the temperature difference between the present (starting) engine coolant temperature and the stored engine coolant temperature from the last period of engine operation is derived. The second difference is the use of this temperature difference, in place of the engine coolant temperature itself, in deriving the cell reduction factor(s) in step 152'.

Figure 6:
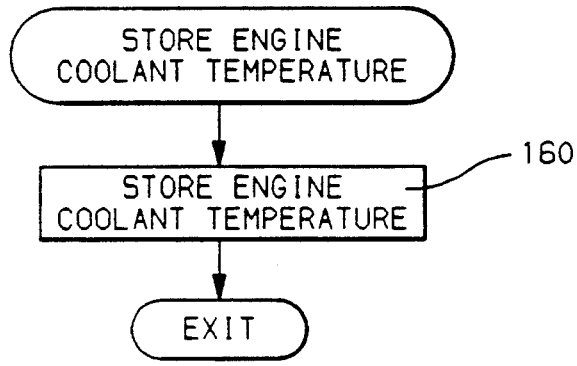

In addition, the flowchart of this alternative INITIAL ENGINE OPERATION subroutine shown in FIG. 5 must be supplemented by additional programming code which stores the engine coolant temperature in non-volatile memory in such a way as to store the temperature just prior to the cessation of such operation. This can be, accomplished by repeatedly storing the temperature during engine operation, so that an updated engine coolant temperature is always in non-volatile memory when the engine stops. A preferred embodiment is shown in FIG. 6, in the form of a subroutine STORE ENGINE COOLANT TEMPERATURE, which is included in a portion of the engine control program run repeatedly during engine operation. This subroutine may be represented as a step 160, in which the engine coolant temperature, having been read, is stored in non-volatile memory. The subroutine does not need to be called as often as that which includes the flowchart of FIG. 3, since the engine coolant temperature does not change that fast. In fact, most engine computer controls already include a routine for reading and storing engine coolant temperature at an appropriate frequency; and non-volatile memory need only be provided for the storage. Thus, the last reading of engine coolant temperature before the cessation of a first period of engine operation will be stored and available for use at the initiation of a second period of engine operation.

The embodiments of the invention in which an exclusive property or privilege is claimed are defined as follows:

1. In an ignition timing system for a spark ignited internal combustion engine having a combustion chamber with combustion ignition apparatus and an engine cooling system with a circulating engine coolant, the ignition timing system comprising means for sensing knock in the combustion chamber and determining therefrom a current knock retard, first memory means comprising a plurality of alterable cells referenced to engine speed and effective to maintain contents when the engine is not operating, means for generating ignition timing signals from the current knock retard and the contents of the cells referenced to a current engine speed, and means for updating the alterable cells during periods of warmed up engine operation in response to the knock sensing means, the improvement comprising, in combination:

second memory means for storing a plurality of temperature correction factors based on engine coolant temperature; and means effective at the initiation of engine operation for (1) sensing engine coolant temperature, (2) deriving a temperature correcting cell modifier value from the temperature correction factors stored in the second memory means on the basis of the sensed engine coolant temperature, and (3) altering the contents of at least one of the cells in a direction to advance the ignition timing based on the derived temperature correcting cell modifier value.

2. The ignition timing system of claim 1 in which the means for altering the contents of at least one of the cells is effective to reduce the contents of the one of the cells in a proportional manner by multiplying by the derived temperature correcting cell modifier value.

3. The ignition timing system of claim 1 in which the means for deriving a temperature correcting cell modifier value further comprises third memory means for storing the engine coolant temperature just before the cessation of a first period of engine operation and, upon the initiation of a second period of engine operation, deriving the temperature correcting cell modifier value from the difference between the stored engine coolant temperature from the first period of engine operation and the sensed engine coolant temperature at the initiation of the second period of engine operation.

* * * * *